Sept. 20, 1927.
H. L. WARD
FORMING APPARATUS
Filed Sept. 10, 1923
1,642,755
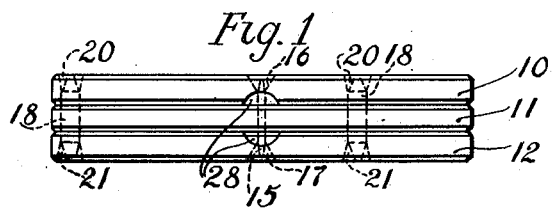
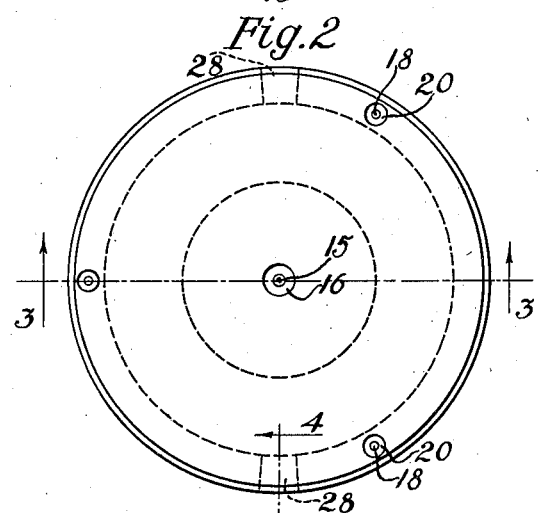
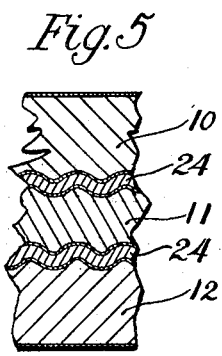
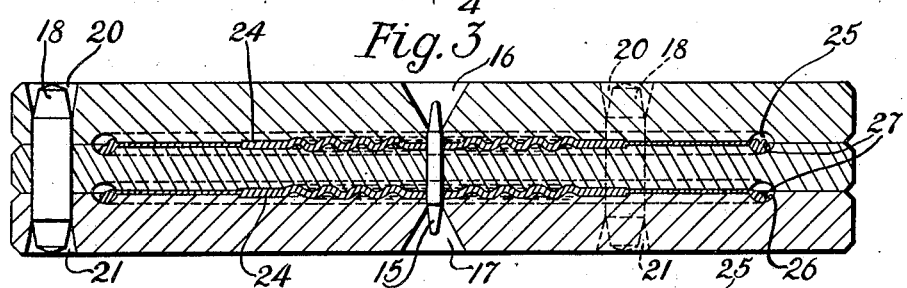
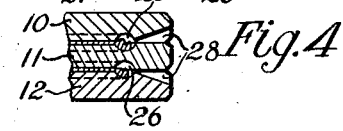
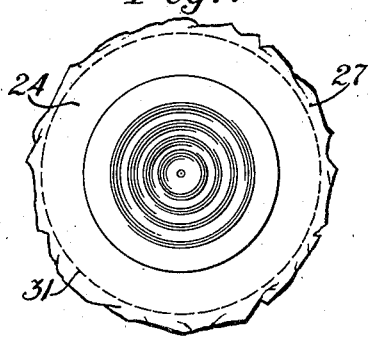
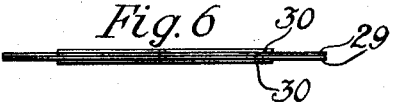
Inventor
Henry L. Ward
by *H.A. Pattison*.
Atty.

Patented Sept. 20, 1927.

1,642,755

UNITED STATES PATENT OFFICE.

HENRY L. WARD, OF CHICAGO, ILLINOIS, ASSIGNOR TO WESTERN ELECTRIC COMPANY, INCORPORATED, OF NEW YORK, N. Y., A CORPORATION OF NEW YORK.

FORMING APPARATUS.

Application filed September 10, 1923. Serial No. 661,789.

This invention relates to forming apparatus, and more particularly to molds employed in forming articles of synthetic resinous material.

In molding phenolic condensation products or other plastic materials into articles, it is sometimes desirable to produce a smooth glossy surface, and it is well known that such a surface can be obtained by placing in contact with the material, during the molding operation, a polished member of non-ferrous metal, such as copper.

Furthermore, in the manufacture of molded articles it is frequently the practice to employ a multiple mold. In such instances it is important that the cooperating parts may be readily assembled in their correct relation, and if the material employed is in partially formed state it is essential that it may be quickly and properly placed in the molding spaces.

It is an object of the invention to improve apparatus for forming synthetic resinous material into articles.

Another object of the invention is to maintain the smoothness of a copper surface contacting with moldable material by reinforcing the contacting copper surface throughout its extent.

A further object is to prevent adherence of synthetic resinous material to a forming member during the formation of the material into an article by coating the mold with copper.

A still further object is to insure the proper positioning of the members of a mold and the material therein by providing means associated with one member and engaging an opening extending through another member.

A forming apparatus made in accordance with one embodiment of this invention may comprise a plurality of steel members, the forming surfaces thereof being plated with copper, and pins secured in one member engaging holes extending through another member to position the members and the material therein.

These and other features of the invention will clearly appear in the following description and the accompanying drawings, in which Figs. 1 and 2 show a side elevation and a plan view of an assembled mold made in accordance with one embodiment of the invention;

Fig. 3 shows an enlarged sectional view taken along the line 3—3 of Fig. 2 and showing the molded article in the mold;

Fig. 4 is a fragmentary sectional view taken at the line 4—4 of Fig. 2;

Fig. 5 shows a portion of Fig. 3 enlarged to clearly indicate the plating on the mold members;

Fig. 6 is an elevation of a plurality of sheets of material assembled for placing in the mold, and Fig. 7 is a plan of the formed article as removed from the mold.

Referring to the drawings, mold members 10, 11 and 12, composed preferably of steel plated with copper, are arranged to be assembled to form a molding unit, depressions in the outer members 10 and 12 cooperating with depressions formed in the two surfaces of the intermediate member 11 to simultaneously form two articles.

A double pointed pin 15 secured in the center of and projecting from the top and bottom surfaces of the intermediate member 11 is adapted to project through the material to be formed and into centrally located holes 16 and 17 extending through members 10 and 12 respectively. This pin serves to properly position the material in the mold. A plurality of double pointed pins 18 also mounted in, and near the periphery of the intermediate member 11, engage holes 20 and 21 extending through members 10 and 12 to insure the correct alignment of the molding depressions of the members 10, 11 and 12. The holes 16, 17, 20 and 21 are countersunk as shown so that obstructions may be more readily removed therefrom and to provide space to receive the overflow of the material. Circular cavities 25 and 26 formed by cooperating grooves in the members 10, 11 and 12 are provided to receive surplus material 27 which may not be required in the completed article. Slots 28 are provided, into which a tool may be inserted to assist in separating the members upon the completion of a molding operation.

The mold as illustrated is particularly adapted for forming a plurality of sheets 29 and 30 of fibrous material, preferably of linen, and which preferably may be impregnated with a phenolic varnish which is dried and thus partially cured or condensed, into an integral sheet 24. Such a sheet may serve as a diaphragm for translating electrical impulses into sound waves when mounted in a structure such as that disclosed and claimed in the patent issued to F. S. Kochendorfer, No. 1,559,260, October 27, 1925. It is, however, to be understood that the scope of the invention is not in any manner limited to the manufacture of such an article.

In the molding operation the members 10, 11 and 12 are disassembled and the member 11 is placed in a horizontal position suitably supported upon a table. Two of the centrally perforated disks 29 are then assembled between two of the small disks 30, also centrally perforated, upon the pin 15 and against the upper surface of the member 11. Member 12 may then be placed against the upper surface of the member 11, the projecting ends of pins 15 and 18 engaging the holes 17 and 21 respectively. The associated members 11 and 12 are then turned to place the exposed surface of member 11 uppermost. Another set of disks 29 and 30 is assembled upon the upwardly projecting point of pin 15, and the member 10 is placed upon the member 11, the pins 15 and 18 engaging holes 16 and 20 respectively. It is to be noted that the depressions in the member 11 are identical and that therefore members 10 and 12 may be indiscriminately associated with either surface of member 11.

The filled mold may then be placed, in company with a plurality of other similar molds, between platens which may exert a pressure of 1000 pounds per square inch upon the disks and heat them to a temperature of approximately 320° F. for approximately 6 minutes. The platens are then separated, the molds are removed therefrom and placed between cooling platens for approximately 2 minutes. The mold members may then be separated by the insertion of a pointed tool in the slots 28 and the molded articles 24 removed therefrom. The ragged edge 27 consisting of the surplus resin which collected in the cavity 25 in the molding process are removed by cutting along the dotted line 31, leaving the completed article of the correct size. The molds, including the holes 17 and the cavities 25, are then cleaned if necessary and the operation repeated.

It will be noted that the pressures, temperatures and length of molding and cooling periods are those usually followed in curing a sheet of synthetic resinous material into a hard infusible and insoluble product.

The condensation product does not adhere to the copper plating of the mold, and due to the polished surface of the molding depression, a smooth glossy surface is produced upon the molded article. Also due to the use of steel as a reinforcing material for the copper plating, the molding surface is not subject to distortion or defacement during the molding and handling operations.

What is claimed is:

1. In an apparatus for forming material into an article, a central disk, a plurality of pins tapered at either end mounted in the disk so as to project from both sides of the disk, and planiform members adapted to co-operate with the disk in forming material having apertures to be engaged by the pins to hold the members in position.

2. In an apparatus for forming material into an article, a member having an indentation for shaping the material, said member formed of metal having a relatively high elastic limit, and a thin copper face integrally united with the member for contacting with the material to be formed.

3. In an apparatus for forming material into an article, a member for shaping the material, said member made of metal having a relatively high elastic limit, and copper plated upon the member to form a face for contacting with the material to be formed.

4. In an apparatus for forming material into an article, a hardened steel member for shaping the material, and a thin coating of copper plated thereon to form a face for contacting with the material to be formed.

5. In an apparatus for forming synthetic resinous material into an article, a hardened steel member for shaping the material, and copper plated on the member to form a face for contacting with the synthetic resinous material.

6. In an apparatus for forming material into an article, a plurality of members having co-operating depressions for forming the material, said members made of metal having a relatively high elastic limit, and a thin copper covering for said members conforming with the depressions thereof and integrally united with the members.

7. In an apparatus for forming material into an article, a plurality of members having co-operating depressions for forming the material, said members formed of metal having a relatively high elastic limit, and copper plated on said members to form a face for contacting with the material to be formed.

8. In an apparatus for forming synthetic resinous material into an article, a plurality of hardened steel members having co-operating depressions for forming the material, and a thin coating of copper plated on said members to form a face for contacting with the synthetic resinous material.

9. A mold for simultaneously forming a plurality of articles, comprising three members, said members having co-operating depressions for forming material into articles when placed adjacent to each other, and means carried by the intermediate member of the adjacently placed members and engaging the other members for positioning the members.

10. A mold for forming an article, comprising top, bottom and intermediate mold members, said members having co-operating depressions for forming material into articles, and means carried by the intermediate member and engaging the other members for positioning the members.

11. A mold for forming a plurality of articles, comprising top and bottom members having depressions therein, an intermediate member having a plurality of depressions for co-operating with the depressions in the top and bottom members to simultaneously form a plurality of articles, and means carried by the intermediate member for positioning the members.

12. A mold for simultaneously forming a plurality of articles, comprising three members, said members having co-operating depressions for forming material into articles when placed adjacent to each other, and a pin mounted in the center of the intermediate member and carried thereby and projecting from opposite sides of said intermediate member to engage the other members for positioning the members.

In witness whereof, I hereunto subscribe my name this 30th day of August A. D., 1923.

HENRY L. WARD.